(12) United States Patent
Grabowski et al.

(10) Patent No.: US 7,698,254 B2
(45) Date of Patent: Apr. 13, 2010

(54) SYSTEM AND METHOD FOR PRODUCING SCORED SEARCH RESULTS ON A DATABASE USING APPROXIMATE SEARCH QUERIES

(75) Inventors: Michal Grabowski, Solon, OH (US); Majid Emami, Saratoga, CA (US); James M. Hom, Long Beach, CA (US); Keyvan Mohajer, Saratoga, CA (US)

(73) Assignee: Melodis Corporation, Sunnyvale, CA (US)

( * ) Notice: Subject to any disclaimer, the term of this patent is extended or adjusted under 35 U.S.C. 154(b) by 0 days.

(21) Appl. No.: 11/778,752

(22) Filed: Jul. 17, 2007

(65) Prior Publication Data
US 2008/0082530 A1 Apr. 3, 2008

Related U.S. Application Data

(60) Provisional application No. 60/807,998, filed on Jul. 21, 2006, provisional application No. 60/821,510, filed on Aug. 4, 2006.

(51) Int. Cl.
*G06F 17/30* (2006.01)
*G06F 17/00* (2006.01)
(52) U.S. Cl. .................. 707/2; 707/3; 707/4; 707/5
(58) Field of Classification Search .......... 707/2–5; 704/236, 231, 249, 254, 255
See application file for complete search history.

(56) References Cited

U.S. PATENT DOCUMENTS

| 5,875,443 | A | 2/1999 | Nielsen |
| 6,006,225 | A | 12/1999 | Bowman et al. |
| 6,408,270 | B1 * | 6/2002 | Garber ................. 704/251 |
| 7,124,129 | B2 * | 10/2006 | Bowman et al. ............ 707/5 |
| 7,321,892 | B2 * | 1/2008 | Vadon et al. .............. 707/4 |

OTHER PUBLICATIONS

International Search Report and Written Opinion for International Application No. PCT/US07/73710 dated Nov. 24, 2008.

* cited by examiner

*Primary Examiner*—Yicun Wu
(74) *Attorney, Agent, or Firm*—Ernest J. Beffel, Jr.; Haynes Beffel & Wolfeld LLP

(57) ABSTRACT

A method for searching a database to produce search results from queries likely to contain errors. The process begins by identifying database features likely to be useful in searching, and those features are employed to index the database. After receiving a query from a user, the system develops a rough score for the query, by extracting features from the query, assigning match scores to query features matching database features; and assigning approximation scores to query features amenable to approximation analysis with database features. The rough score is used to identify identifying a set of database records for further analysis. Those records are then subjected to a more detailed rescoring process, based on correspondence between individual query elements and individual record elements, and between the query and the database record content, taken as a whole. Based on the rescoring process, output is provided to the user.

16 Claims, 9 Drawing Sheets

| ID | Title | Artist | Album |
|---|---|---|---|
| 1 | Dance Me to the End of Love | Leonard Cohen | Various Positions |
| 2 | Lady in Red | Chris de Burgh | Into the light |
| 3 | Heartbreaker | Mariah Carey | Rainbow |
| 4 | Petals | Mariah Carey | Rainbow |
| 5 | Vulnerability | Mariah Carey | Rainbow |
| 6 | Bliss | Mariah Carey | Rainbow |
| ... | | | |
| 1000 | Dangerous | Britney Spears | Hit me baby |
| 1001 | Dangerous | Britney Spears | Dangerous |
| ... | | | |
| 2000 | Dog | Britny Fox | Hair of the Dog |
| ... | | | |

Fig. 2

| Key | Field | ID |
|---|---|---|
| Dance | Title | 1 |
| Loenard | Artist | 1 |
| Cohen | Artist | 1 |
| Various | Album | 1 |
| Positions | Album | 1 |
| Heartbreaker | Title | 2 |
| Mariah | Artist | 2, 3, 4, 5 |
| Carey | Artist | 2, 3, 4, 5 |
| Rainbow | Album | 3, 4, 5 |
| Petals | Title | 3 |
| Vulnerability | Title | 4 |
| Bliss | Title | 5 |
| Dangerous | Title | 1000, 1001 |
| Dangerous | Album | 1001 |
| Britney | Artist | 1000, 1001 |
| Spears | Artist | 1000, 1001 |
| Hit | Album | 1000 |
| Me | Album | 1000 |
| Baby | Album | 1000 |
| Dog | Title | 2000 |
| Dog | Album | 2000 |
| Britny | Artist | 2000 |
| Fox | Artist | 2000 |

Fig. 3a

| Key | Field | ID |
|---|---|---|
| TNS | Title | 1 |
| LNRT | Artist | 1 |
| KHN | Artist | 1 |
| FRS | Album | 1 |
| PSXN | Album | 1 |
| HRTP | Title | 2 |
| MR | Artist | 2, 3, 4, 5 |
| KR | Artist | 2, 3, 4, 5 |
| RNP | Album | 3, 4, 5 |
| RNPF | Album | 3, 4, 5 |
| PTLS | Title | 3 |
| FLNR | Title | 4 |
| PLS | Title | 5 |
| TNJR | Title | 1000, 1001 |
| TNKR | Title | 1000, 1001 |
| TNJR | Album | 1001 |
| TNKR | Album | 1001 |
| SPRS | Artist | 1000, 1001 |
| HT | Album | 1000 |
| M | Album | 1000 |
| PP | Album | 1000 |
| TK | Title | 2000 |
| TK | Album | 2000 |
| FKX | Artist | 2000 |

Fig. 3b

| Input Word | Metaphone 1 | Metaphone 2 |
|---|---|---|
| Dangerous | TNJR | TNKR |
| Dayngeros* | TNJR | TNKR |
| Briny* | PRN | PRN |
| Brimey | PRTN | PRTN |
| Spears* | SPRS | SPRS |
| Complete | KMPL | KMPL |
| Angel | ANJL | ANKL |
| Jokoer | JKR | AKR |
| Hallelujah | HLLJ | HLLH |
| Yesterday | ASTR | ASTR |

Fig. 5

| Source Word | Target Word | Edit Distance |
|---|---|---|
| briny | brimey | 2 |
| briny | britny | 1 |
| dayngeros | dangerous | 2 |

Fig. 6

| Features | Explanation |
|---|---|
| Dayngeros | exact word extracted from the search input |
| TNKR | metaphone 1 corresponding to "dayngeros" |
| TNJR | metaphone 2 corresponding to "dayngeros" |
| Dangerous | word in the Dictionary having an equidistance of 2 from "dayngeros" |
| briny | exact word extracted from the search input |
| PRN | metaphone corresponding to "briny" |
| Britny | word found in the Dictionary having an edit-distance of 1 from "briny" |
| Britney | word found in the Dictionary having an edit-distance of 2 from "briny" |
| Spears | exact word extracted from the search input |
| SPRS | metaphone corresponding to "spears" |

Fig. 7

| Key | Field | Matching IDs |
|---|---|---|
| dayngeros | Title | None |
| | Artist | none |
| | Album | None |
| | | |
| TNKR | Title | 1001, 1000 |
| | Artist | none |
| | Album | 1001 |
| | | |
| TNJR | Title | 1001, 1000 |
| | Artist | none |
| | Album | 1001 |
| | | |
| dangerous | Title | 1001, 1000 |
| | Artist | none |
| | Album | 1001 |
| | | |
| Briny | Title | none |
| | Artist | none |
| | Album | none |
| | | |
| PRN | Title | none |
| | Artist | none |
| | Album | none |
| | | |
| britny | Title | none |
| | Artist | 2000 |
| | Album | none |
| | | |
| britney | Title | none |
| | Artist | 1001, 1000 |
| | Album | none |
| | | |
| spears | Title | none |
| | Artist | 1001, 1000 |
| | Album | none |
| | | |
| SPRS | Title | none |
| | Artist | 1001, 1000 |
| | Album | none |

Fig. 8

| | Total Number of Metaphones (excluding double metaphones) | Total Number of Letters in Search Query (excluding spaces) | Matching IDs for Title | Matching IDs for Artist | Matching IDs for Album | Number of Letters in Edit Distance Word | Edit Distance Number | Score for Each Matching ID |
|---|---|---|---|---|---|---|---|---|
| dayngeros | 3 | 20 | none | none | none | N/A (this is not an Edit Distance Word) | 0 | 0.4500 |
| TNKR | 3 | 20 | 1000, 1001 | none | 1001 | N/A (this is not an Edit Distance Word) | N/A | 0.3333 |
| TNJR | 3 | 20 | 1000, 1001 | none | 1001 | N/A (this is not an Edit Distance Word) | N/A | 0.3333 |
| dangerous | 3 | 20 | 1000, 1001 | none | 1001 | 9 | 2 | 0.2722 |
| briny | 3 | 20 | none | none | none | N/A (this is not an Edit Distance Word) | 0 | 0.2500 |
| PRN | 3 | 20 | none | none | none | N/A (this is not an Edit Distance Word) | N/A | 0.3333 |
| britny | 3 | 20 | none | 2000 | none | 6 | 1 | 0.2083 |
| britney | 3 | 20 | none | 1000, 1001 | none | 7 | 2 | 0.1786 |
| spears | 3 | 20 | none | 1000, 1001 | none | N/A (this is not an Edit Distance Word) | 0 | 0.3000 |
| SPRS | 3 | 20 | none | 1000, 1001 | none | N/A (this is not an Edit Distance Word) | N/A | 0.3333 |

Fig. 9

| Matching ID | Key | Score |
|---|---|---|
| 1000 | TNKR and TNJR | 0.3333 |
| | dangerous | 0.2722 |
| | britney | 0.1786 |
| | spears | 0.3000 |
| | SPRS | 0.3333 |
| Total | | 1.4175 |

| Matching ID | Key | Score |
|---|---|---|
| 1001 | TNKR and TNJR | 0.3333 |
| | dangerous | 0.2722 |
| | britney | 0.1786 |
| | spears | 0.3000 |
| | SPRS | 0.3333 |
| | | 1.4175 |

| Matching ID | Key | Score |
|---|---|---|
| 2000 | britny | 0.2083 |

Fig. 10

| Rank | Title | Artist | Album |
|---|---|---|---|
| 1 | Dangerous | Britney Spears | Hit me baby |
| 2 | Dangerous | Britney Spears | Dangerous |
| 3 | Dog | Britny Fox | Hair of the Dog |

Fig. 11

SYSTEM AND METHOD FOR PRODUCING SCORED SEARCH RESULTS ON A DATABASE USING APPROXIMATE SEARCH QUERIES

RELATED APPLICATION

This application is related to U.S. Patent Provisional Application Nos. 60/807,998 filed on Jul. 21, 2006 and 60/821,510 filed on Aug. 4, 2006, both naming Michal Grabowski, Majid Emami, James M. Hom, and Keyvan Mohajer as inventors and entitled "System and Method for Producing Scored Search Results on a Database Using Approximate Search Queries." The related applications are incorporated by reference herein for all purposes.

BACKGROUND OF THE INVENTION

The present invention relates generally to systems and methods for database searching, and in particular to database searches in which the user is highly likely to provide input containing errors.

Most database engines assume that the user will provide correct input. That assumption has a number of results, starting with the general tendency to demand input in a number of separate fields. Then, search engines most often look only for exact matches to the user input.

One can see this problem in operation at the popular consumer website operated by Amazon.com, at http://www.amazon.com. A person entering that site to purchase, for example, a recording of a Johann Sebastian Bach cantata must first locate an appropriate recording, which begins by selecting a category in which to search. A consumer who knows how the name is pronounced, but unfamiliar with German spelling conventions could easily enter the name as, say, "Johan Bock". The search engine, unfortunately, cannot cope with that sort of mistake—it returns zero hits. An American consumer could flail around for some time before coming up with "Bach" as the correct spelling, but the search engine will obstinately refuse to return hits until the entry is correct.

Simple typing errors have the same consequence. A user seeking Britney Spears recordings at Amazon.com, but entering "britny" in the search window, will see pages of listings for Britny Fox but not a single hit for Miss Spears. A slip with her last name, entering "spers" for example, returns no hits at all. Users can quickly become frustrated with such results.

Clearly, any consumer-oriented e-commerce website that could offer automatic help to a consumer in these situations will attract numbers of adherents. In a business context, where user frustration is measured in lost productivity, tools that speed searching would be highly sought after.

SUMMARY OF THE INVENTION

An aspect of the invention is a method for search a database to produce search results from queries likely to contain errors. The process begins by identifying database features likely to be useful in searching, and those features are employed to index the database. After receiving a query from a user, the system develops a rough score for the query, by extracting features from the query, assigning match scores to query features matching database features; and assigning approximation scores to query features amenable to approximation analysis with database features. The rough score is used to identify identifying a set of database records for further analysis. Those records are then subjected to a more detailed rescoring process, based on correspondence between individual query elements and individual record elements, and between the query and the database record content, taken as a whole. Based on the rescoring process, output is provided to the user

BRIEF DESCRIPTION OF THE DRAWINGS

FIG. 2 depicts a database table.

FIGS. 3a and 3b are hashtables built from the database of FIG. 2 according to the claimed invention.

FIG. 5 illustrates a table of returns provided by the double metaphone system for selected words.

FIG. 6 illustrates calculated edit distances between an example query words and selected target words from the database.

FIG. 7 depicts the features extracted from an example database query.

FIG. 8 shows the list of features identified above, with matching database record ID's.

FIG. 9 details the analysis of search terms with the database.

FIG. 10 sets out the rough scoring of a query, applied to several records.

FIG. 11 depicts an output list of database records responding to the query.

DETAILED DESCRIPTION

Figure 1:
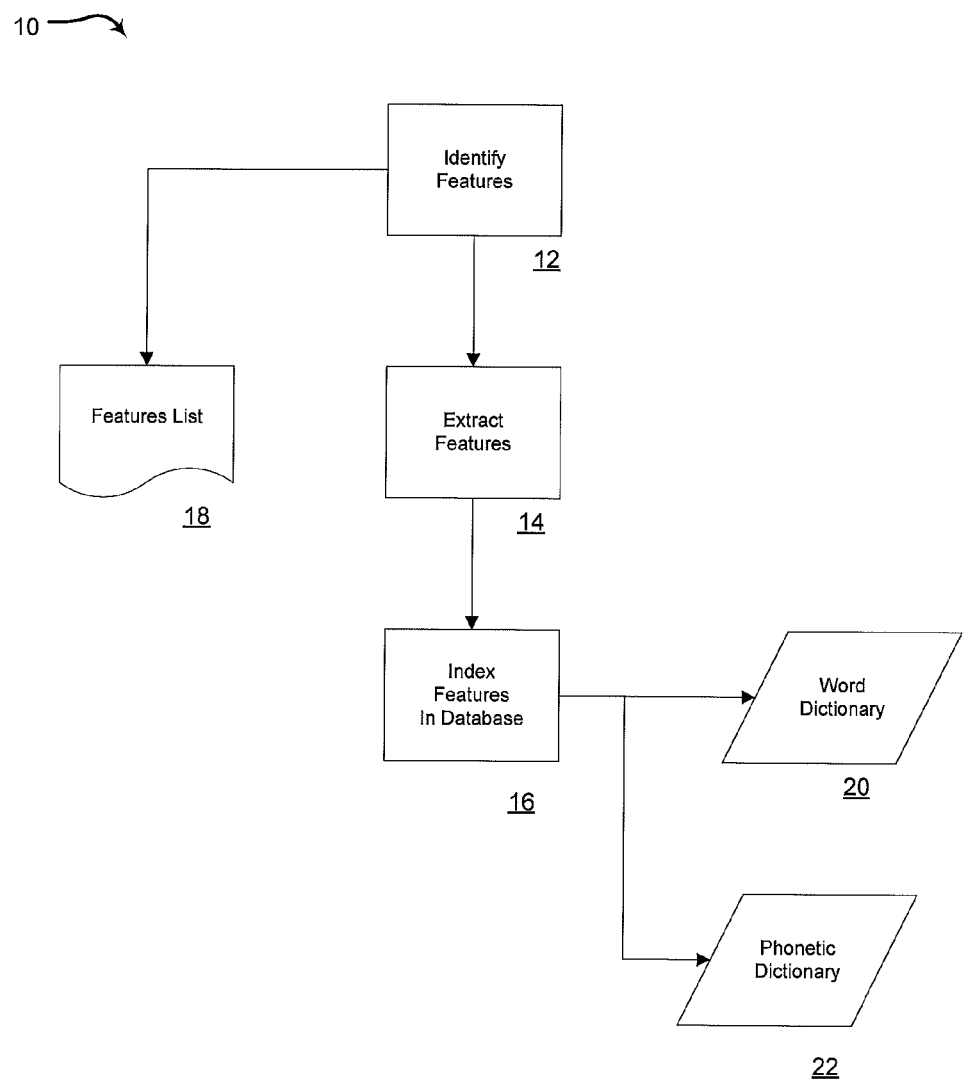
FIG. 1 is a flowchart describing the process of preparing a database for searching.

The following detailed description is made with reference to the figures. Preferred embodiments are described to illustrate the present invention, not to limit its scope, which is defined by the claims. Those of ordinary skill in the art will recognize a variety of equivalent variations on the description that follows.

It is to be understood that both the foregoing general description and the following detailed description are exemplary and explanatory only and are not restrictive of the invention, as claimed. It may be noted that, as used in the specification and the appended claims, the singular forms "a", "an" and "the" include plural referents unless the context clearly dictates otherwise. Thus, for example, reference to "a material" may include mixtures of materials, reference to "file" may include multiple files, and the like. References cited herein are hereby incorporated by reference in their entirety, except to the extent that they conflict with teachings explicitly set forth in this specification.

The methods and systems set out herein are applicable to any environment including a database that handles queries from users. Specific examples will be set out during discussion of various points. In order to promote understanding of the invention, one embodiment is discussed in considerable detail, showing operation of a database search engine in location music information (related to recordings and the like) in a data that catalogs information concerning performers, songs and recording. This embodiment is presented as illustrative material only, and it will be emphasized throughout that the same principles apply to other embodiments. Immediately occurring examples include embodiments dealing with books or magazines, having information related to authors, titles and publisher/publication, or perhaps real estate listings, showing owners, locations, and information about the property. These and a range of other embodiments may be practiced employing the principles set out herein.

It should also be noted that hardware and software supporting the database of the claimed invention may be chosen, configured and operated by those in the art, according to known principles and techniques. Database software offered commercially by companies such as Oracle and running as server-based or client-server systems on servers manufactured by companies such as Hewlett-Packard, Sun Microsystems or IBM, on platforms supported by Microsoft, Linux or other operating systems, all may be chosen according to normal industry standards for operation under the claimed invention.

The embodiment primarily discussed here deals with retrieving recorded music, or more exactly, information about recorded music. In some variants of the embodiment, separate database tables include actual copies of the recorded music, which can be retrieved using the information gained from the search engine. For present purposes, however, it will be sufficient to retrieve information about the music. It is understood that the music involved here is recorded on a medium such as a CD, DVD, tape or vinyl record, referred to as an "album". Each album includes a number of songs, each of which is performed by an entity called the "artist".

Before one can begin searching, of course, data must be gathered, entered and processed. Most such operations regarding databases according to the present invention differ not at all from those known in the art, and such matters can be left to the knowledge and experience of such practitioners. Some operations are particular to the present invention, however, and those are shown in FIG. 1. There, a process 10 occurs off-line, under sole control of whatever database management system is in use at the database location, which may be a server, mainframe or other appropriately-sized computer, based on the scope of the work expected. In the embodiment shown, the database table to be searched consists of information related to musical recordings, as illustrated by the database extract shown in FIG. 2. As seen, data records have four fields, labeled ID, Title, Artist and Album, containing, respectively, the key number, song title, artist and album name. The key number is not accessible by or visible to the user, as this number is assigned as a unique key identifying the data record, and known in the database art.

Referring now to FIG. 1, one embodiment of a system according the present invention will now be described. FIG. 1 is a schematic showing the flow of steps and pages a user may view while using one embodiment of the present invention.

The first preliminary step in structuring a search engine is to determine what features the search engine will look for. This question extends beyond an inquiry about the substantive content of the data to inquire into the nature of the data. If the data were in the graphic form, for example, a specialized search engine would be required. Here, it can be seen in FIG. 2 that the data are all words, but that fact does not answer the question, because words can be regarded as pure text, so that the search engine seeks only to match an ASCII or Unicode value from the query to one in the database. That traditional method of thinking about text searching can be supplemented by a semantic view, where the search engine looks for synonyms or thesaurus entries. Alternatively, the search engine can try to identify, catalog and search for words phonetically, based on what they sound like. This feature can be particularly useful if the database contains name entries. Such analysis can be useful, given the facts that names are not tied to any meaning, and that many variant spellings exist for names that sound similar. Names that have been transliterated from a non-Latin script at some point are highly susceptible to such variations. The name "Crane" for example, is taken from a Gaelic root variously rendered as Came, Crain, Crean, Cryan, and Creghan. It is useful to employ a single code or term, based on sound, that places these variants in a single category.

Features are thus a meta-level description of the sorts of data that will be sought. Those in the art can analyze database content to determine what features will produce the best results in specific instances. Here, it was determined that the database entries could best be described employing two features—word (text) entries and phonetic analysis. In another embodiment, including pictures, a visual pattern feature could be employed, and another, having a text description field, could usefully include a semantic analysis feature.

Text features are handled by comparing codes, such as ASCII or Unicode. Phonetic features, however, can be derived in a number of ways. The oldest method follows an algorithm called Soundex, which produces a four-digit code consisting of a letter followed by three numerals. All of the names listed above, for example, fall under Soundex code C650. A more recent algorithm for addressing phonetic features is the Metaphone system, which produces a one- to four-letter result. Persons can readily appreciate the fact, however, that not only can words that sound alike be spelled differently, but words spelled similarly may have multiple pronunciations. The Double Metaphone algorithm takes that fact into account and returns two codes in instances where different pronunciation is possible. These embodiment offer tradeoffs in terms of performance versus speed and accuracy, and those in the art can determine which algorithm offers the best result for specific systems. The embodiment emphasized here employs the Double Metaphone method.

Turning back to FIG. 1, the feature set is determined in step 12, outputting a Feature List 18. Step 14 proceeds to extract the identified features from each data record in the database. Given that the features to be extracted are words and sounds, step 14 begins by assembling a list of every word in the database, which list is then indexed in a chosen manner, as by placing entries in alphabetical order, resulting in a dictionary, or hashmap, such as that shown in FIG. 3a. Separate dictionaries 20 and 22 are provided for words and phonetic features. The relevant information for each word is the record ID from which it was taken and the identifier for the field from which it was extracted. The former is a self-evident requirement, likely to be needed in any result of this sort. The latter is the product of some analysis, as the database designer must consider what information is likely to be useful to the user. Here it was determined that knowing whether the term "dance", the first listing, appears in a title, artist or album field was determined to be important to the anticipated use of the system. Note that separate entries are made for words that appear in different fields, such as the term "dangerous".

A similar listing of phonetic entries is seen in FIG. 3b, recording the Metaphone codes associated with each word.

The operations shown in FIG. 1 all occur offline, without interaction from users. Initial information is present when the database is constructed, and then additional information is added, as more information is incorporated into the database, and other information is either deleted or edited. Even though some such actions involve user interaction with the system, the index-building steps are performed at a central level.

Figure 4:
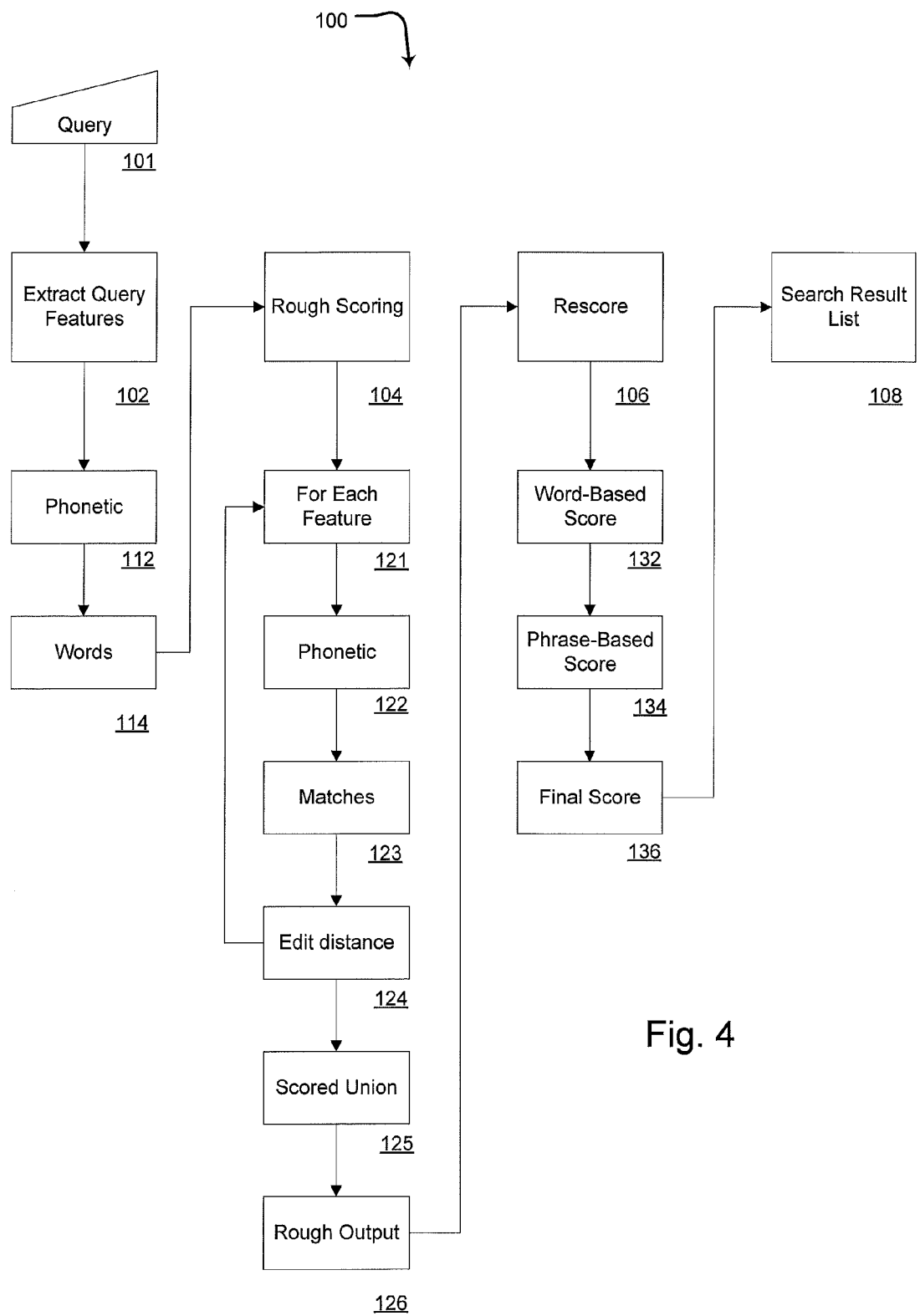
FIG. 4 is a flowchart showing the process of receiving a search query, processing the same, and outputting results to the user.

The primary interaction that users have with the database is in searching for information, using the process set out in FIG. 4. Continuing with the embodiment discussed to this point, of a system designed to find recorded music, the user primarily encounters the system on the owner's website, as part of an ecommerce operation, here engaged in offering and selling recorded music to users. In another embodiment, the search engine runs on a kiosk as part of a music retail operation, helping users find music available in the store. In either embodiment, the user enters a set of keywords, related to the song, artist or album sought. Many such interfaces demand that the user enter query information into separate on-screen boxes, based on the nature of the information. Here, it is an advantage that the system of the claimed invention categorizes the data itself, allowing the user to enter as many or few keywords as desired into a single data block.

The user here is looking for the song "Dangerous" by Britney Spears. As often happens, however, the user makes a mistake entering the first word, which emerges as "dayngeros", and she is not sure how to spell the artist's first name, which comes out as "briny". The query fed to the system is thus "dayngeros briny spears". It should be noted that the leading music shopping site produces no hits from that query.

The query process of FIG. 4 can be seen in four general parts. After the query is entered in step 101, the query is parsed and features extracted, in step 102. Then a rough scoring 104 is performed, producing only a small number of hits to be considered in detail, followed by a fine scoring, or rescore 106. Then, a search result list is published to the user, at step 108. Each of those steps is discussed in detail below.

The parsing and feature extraction step, 102, differs from the feature extraction described above in that here, the features under consideration (words and phonetics) are decided, and the specific examples of such features are identified. First, phonetic features are identified at step 112, done in this embodiment by applying the Double Metaphone algorithm to find the Metaphone codes associated with those words. FIG. 5 sets out a number of words, including those of the query (indicated by asterisks), together with the codes developed under the Double Metaphone system adopted here, as noted above. Other embodiments employ the Single Metaphone or Soundex systems, producing in the former instance the same codes seen under Metaphone 1 of FIG. 5, or, for Soundex, a letter plus three numbers.

Step 114 identifies words identical and similar to those of the query. Here, the query includes three words, "dayngeros", "briny" and "spears". For each of those words, identical words can be identified rapidly by simple lookup in a target word dictionary, such as the example created above. Thus, when the song "Blue Suede Shoes" is added to the database, the target dictionary is augmented by entries for "blue", "suede" and "shoes", if these words do not already appear in the dictionary. An additional sophistication, used by the embodiment here, includes a dictionary that recognizes common variations, such as verb forms, plurals and the like.

Finding similar words is a bit more difficult, requiring the application of analytical techniques based on string comparisons, employing algorithms such as edit distance, Hamming distance or Levenshtein distance calculations. Simply put, these calculations measure the changes required to move from one string to another. Choice of the particular algorithm can be left to those of skill in the art, balancing computational speed and efficiency against required accuracy. The embodiment discussed here employs the straightforward edit distance, which measures the number of differences between two strings. For example, changing the word "train" to "brain" requires one change—replace the t with a b. The edit distance between those two strings in thus 1. It can easily be seen that there should be a maximum allowed edit distance for strings to qualify as "similar", and thus that choice becomes a design parameter. In the embodiment shown, the maximum edit distance is 2. Thus, step 114 finds exact and similar matches by identifying words exactly the same as those of the query, plus words that differ with the entered words by a maximum edit distance of 2.

Applying those principles to the query, the words "briny" and "spears" are identical to standard English words. Results of an edit distance analysis can be seen in FIG. 6, showing that target words "britny" and "Britney" (not English words but in the dictionary as names) have edit distances of 1 and 2 from "briny". Also, the standard word "dangerous" has an edit distance of 2 from the query word "dayngeros".

A summary of the query features is shown in FIG. 7.

Rough scoring, step 104, as the name implies, produces an approximate result, but it does so very rapidly. This step in effect filters out all but a very few of the possible database hits, allowing the system to concentrate its analysis on those few items. In this fashion a database having millions of data entries can deal with problems such as error compensation that usually require voluminous processing time. Various embodiments of the claimed invention can employ a number of different scoring techniques. Those in the art are able to adapt the principles shown herein to specific situations to develop techniques, or to adjust variable parameters, as required.

Steps 121-126 analyze each feature passed from the extraction step 102 to determine a rough score. Control block 121 loops steps 122, 123 and 124 through each identified feature, performing phonetic scoring, step 122, match scoring, at step 123 and edit distance scoring, at step 124, as appropriate. Matches, of either a metaphone or complete word, generally found from hashmaps or dictionaries such as FIGS. 3a and 3b, are identified as shown in FIG. 8, indicating ID's associated with matches of metaphones or words in each field.

Scoring for matching phonetic characteristics, step 122, can be carried out, for example, using the formula $$M_c/M_n \qquad \text{Eq. 1}$$

where $M_c$ is a constant weighting factor, assigned according to the importance accorded to matching phonetic characteristics within the context of a particular application. $M_n$ is the number of words extracted from a search query. One embodiment assigns a higher weighting factor in specific situations, such as particularly uncommon phonetic characteristics, reasoning that matching such unusual items is a good sign that the match is correct. Here, assigning a value of 1 to $M_c$, then $M_n=3$, based on the number of words in the query. Results of these calculations for each of the four metaphones from the example are seen in FIG. 9.

Scoring for exact matches of words, step 123, proceeds in the present embodiment based on the number of letters in the query as a whole and the number of letters in the matched word. It should be noted that additional weight can be assigned to exact matches, if desired. Here, word matches are scored according to the formula $$N_d/N_t \qquad \text{Eq. 2}$$

Where $N_d$ is the number of letters in the exact match and $N_t$ is the total number of letters in the query (excluding spaces). Scoring for the exact matches found in the example (the word "spears") is shown in FIG. 9.

Finally, a score based on edit distance is calculated at step 124, according to the formula $$(N_d-D)^2/(N_d \times N_t) \qquad \text{Eq. 3}$$

where Nd is the number of letters in the matching word, D is the edit distance between the query word and the matching word, and $N_t$ is the total number of letters in the search query.

It can be seen that some judgment is exercised in the selection of the scoring formula. Other formulae can be chosen here, as will be well within the skill of those in the art to determine, based on needs of individual systems. Results of edit distance calculations for the words "dangerous", "britny" and "britney" are shown in FIG. 9.

Having completed the individual scoring of each feature, the system proceeds to obtain a total score for each possible record implicated in the search to that point. That total, taken at step 125, is referred to as a scored union method, as it starts with the union of all features that refer to a given record ID. As seen in FIG. 10, for example, record ID 1000 (seen in FIG. 2 as the song "Dangerous" performed by Britney Spears, from the album "Hit me baby") is referred to in five features: metaphones TNKR/TNJR; the word "dangerous", within an edit distance of 2 from "dayngeros"; the word "britny", within an edit distance of 2 from "briny"; the word "spears", an exact match; and metaphone SPRS. The scores for those features are summed, yielding an overall score for record ID 1000 of 1.4175.

After calculating the scores for all relevant ID's a rough scoring result is output in step 126. This result is not exact, as noted above, but it is very fast. Thus, rather than performing computing-intensive analysis of a large number of records, only a small number of candidates are passed from Rough Scoring to the Rescoring step 106. The number of results passed on from Rough Scoring can be pre-set or capped, ensuring that processing stays within desired limits. A maximum result number, or a minimum score, or some combination of criteria can be established to tune the system as desired.

Other tunable measures include the possible employment of weighting factors. It may be decided, for example, to assign a higher multiple to longer matches, for example, or to weight exact matches more than edit distance matches. In a double metaphone system, results from the first metaphone can be preferred, by assigning a higher multiple, over results from the second metaphone. Similarly, the problem of overlapping matches (occurring when, for example, a song has the same word as the album or artist, as seen in FIG. 2) can be addressed, or not, as desired. In the present example, that issue arises, posing the question whether to increase the score of record ID 1001 because the word "dangerous" occurs twice. As can be seen in FIG. 10, a rule in incorporated into the scoring precluding such a double score. In other embodiments, such multiple scoring is allowed.

Rescoring, in step 106, encompassed two phases, word-based scoring in step 132, and phrase-based scoring in step 134. Overall, the approach here is to employ a more thorough-going algorithm to determine the quality of the match between individual words in the query and those of the selected catalog items, as well as the match between the entire query and the catalog item.

A word based score of the entire catalog item is determined as follows. First, the query is parsed into words $\{1 \ldots N\}$, and every query word in the query is indexed, from $j=\{1 \ldots N\}$. For instance, for the query "dayngeros briny spears", the word "dayngeros" corresponds to $j=1$, the word "briny" corresponds to $j=2$, and the word "spears" corresponds to $j=3$. Fields in the database, also referred to a catalog fields, are similarly indexed from $k=(1 \ldots M)$. The sample database of FIG. 2 contains fields "Title", "Artist" and "Album", which produces indices of "Title" as $k=1$, "Artist" as $k=2$, and "Album" as $k=3$. For every query word $j$ and the data item under consideration, the system finds two things. First is the minimum edit distance between the query word and any of the fields in the catalog item, denoted $d_{min}(j)$. Second, the system notes the data field that produced the minimum edit distance, denoted $k_{min}(j)$. For instance, that process applied to the query "dayngeros briny spears" together with data record ID 1000, results in $k_{min}(1)=1$, $k_{min}(2)=2$, and $k_{min}(3)=2$. That is, the field closest to the first query word, "dayngeros", ($j=1$) is the "Title" field. The word closest to the second query word, "briny", ($j=2$) is the "Artist" field. Finally, the word closest to the third query word, "spears", ($j=3$) is also the "Artist" field. The word-based score for the entire query phrase against the entire data item at the end of the first step is given by the following formula:

$$sw_{item} = \frac{1}{N} \sum_{j=1}^{N} \frac{l_j - d_{min}(j)}{l_j} \qquad \text{Eq. 4}$$

where $l_j$ is the length of $j$, the word in the query; the subscript item refers to the specific data item under consideration; $N$ is the number of words in the query; and $d_{min}(j)$ is the minimum edit distance between the query item and the dictionary item. The resulting score compares the query with the catalog item, word by word.

Phrase-based scoring considers words taken together, and it computes the order in which the fields of a data item must be concatenated to provide the best fit with the entire query phrase. For instance, the catalog item with ID 1000 when compared with the query "dayngeros briny spears" must be concatenated in the order ("Title", "Artist"). For this example, we will compare the phrase "dangerous Britney spears" with "dayngeros briny spears". In order to determine the proper order, the system loops over $k=1$ to $k=M$, where $M$ is the number of fields in the catalog item, analyzing words $j=\{1 \ldots N\}$ of the query, and for each $k$ the system averages every $j$ where $k=k_{min}(j)$.

Consider the process of applying that algorithm to the query "dayngeros briny spears" and the data item ID 1000. For $k=1$ the system first finds all the $j$ values where $k_{min}(j)=1$. As described above, only one such value exists, $j=1$. Thus the average $j$-value for $k=1$ is 1. Similarly, for $k=2$ the system finds all the $j$ values where $k_{min}(j)=2$, which turn out to be $j=2$ and $j=3$. Thus, the average $j$-value for $k=2$ is $(2+3)/2=2.5$. For $k=3$, no $j$ value exists for which $k_{min}(j)=3$. Thus, the average $j$-value for this $k$ is undefined. This average for every $k$ is denoted order($k$), and all the $k$-values for which the average $j$-value is defined are sorted in ascending order of their average $j$-values, $$k_1, k_2, \ldots, k_M \qquad \text{Eq. 5}$$

That calculation allows the formation of the string $$s = concat(f_{item}(k_1), f_{item}(k_2), \ldots, f_{item}(k_M)) \qquad \text{Eq. 6}$$

In which $f_{min}(j)$ is the $j$-th field content of the search item under consideration. The "concat" function concatenates its arguments and inserts a space between consecutive arguments. Thus, considering the same query under consideration above, the order is $$(k_1, k_2) = (1, 2) \qquad \text{Eq. 7}$$

Note here that because the average value for $k=3$ is undefined, it is not includes in the ordered list. Thus, applying Eq. 6 to catalog record ID 1000, $$s = concat(f_{min}(1), f_{min}(2)) = concat(\text{"dangerous"}, \text{"britney spears"}) = \text{"dangerous britney spears"} \qquad \text{Eq. 8}$$

Then the system proceeds to calculate the edit distance $d_{phrase}$ between s and the query phrase and uses that distance to calculate a phrase-based score, $$sp_{item} = \frac{l - d_{phrase}}{l} \qquad \text{Eq. 9}$$

where l is the length of s.

The final score of the item is $$s_{item} = q \times sw_{item} + (1-q) \times sp_{item} \qquad \text{Eq. 10}$$

where q is a tunable parameter between 1 and 0.

The scores for the catalog items under consideration at this stage are calculated and ordered, and the items are output in that rank order, as shown in FIG. 11. In other embodiments, system rules can impose a maximum number of results to be submitted, or otherwise process the results to provide an acceptable result.

Those of skill in the art will recognize that the formulae set out above are examples of one embodiment of the claimed invention. As noted during the discussion, a number of variations in those equations are possible, and indeed, it is most likely that a particular adaptation of the invention to a specific environment would require modification and optimization of some or all of those relationships. The principles of the invention, set out solely in the claims appended hereto, are sufficiently broad to cover such variations and modifications.

We claim as follows:

1. A method for searching a computer database to produce search results from queries containing errors, comprising the steps of
   indexing features and fields of the computer database, including words and phonetic encodings of the words;
   receiving a computer database query from a user;
   rough scoring the computer database query against database records, including
      extracting words from the computer database query;
      assigning match scores to query words matching the computer database features;
      assigning approximation scores to the computer database query words amenable to approximation analysis with the computer database features; and
      identifying a set of computer database records for further analysis;
   rescoring the set of identified computer database records, based on matching the individual computer database query words and individual record fields, and matching at least one phrase of words in the query and multiple fields in the database record; and
   providing output to the user based on the results of the rescoring step.

2. The method of claim 1, wherein the phonetic encodings are Soundex codes.

3. The method of claim 1, wherein the phonetic encodings are Metaphone codes.

4. The method of claim 1, wherein the phonetic encodings are Double Metaphone codes.

5. The method of claim 1, wherein the computer database features include text features.

6. The method of claim 1, wherein text features are indexed by factors including variants.

7. The method of claim 1, wherein text features are indexed by factors including semantic equivalents.

8. The method of claim 1, wherein assigning approximation scores includes calculating the edit distance between a query term under analysis and reference term.

9. The method of claim 1, wherein assigning approximation scores includes calculating the Hamming distance between a query term under analysis and reference term.

10. The method of claim 1, wherein assigning approximation scores includes calculating the Levenshtein distance between a query term under analysis and reference term.

11. The method of claim 1, wherein rescoring includes calculating a word score for each word of the query.

12. The method of claim 11, wherein the word score is given by $$sw_{item} = \frac{1}{N} \sum_{j=1}^{N} \frac{l_j - d_{min}(j)}{l_j}$$

where $l_j$ is the length of the j-th word in the query; the subscript item refers to the specific data item under consideration; N is the number of words in the query; and $d_{min}(j)$ is the minimum edit distance between the query item and a reference item.

13. The method of claim 1, wherein rescoring includes calculating a phrase score for the query.

14. The method of claim 13, wherein the phrase score is given by $$sp_{item} = \frac{l - d_{phrase}}{l}$$

where l is the length of the phrase and $d_{phrase}$ is the edit distance between the phrase and a reference phrase.

15. The method of claim 1, wherein rescoring includes calculating a total score for the query.

16. The method of claim 15, wherein total score is given by $$s_{item} = q \times sw_{item} + (1-q) \times sp_{item}$$

where $sw_{item}$ is a word score and $sp_{item}$ is a phrase score, and q is a tunable parameter between 1 and 0.

* * * * *